United States Patent
Odenwald et al.

(10) Patent No.: US 7,378,962 B2
(45) Date of Patent: May 27, 2008

(54) SENSOR NODE MANAGEMENT AND METHOD FOR MONITORING A SEAL CONDITION OF AN ENCLOSURE

(75) Inventors: Thomas Odenwald, Redwood City, CA (US); Brian S. Mo, Palo Alto, CA (US); Asuman Suenbuel, San Jose, CA (US); Christof Bornhoevd, San Francisco, CA (US)

(73) Assignee: SAP Aktiengesellschaft, Walldorf (DE)

( * ) Notice: Subject to any disclaimer, the term of this patent is extended or adjusted under 35 U.S.C. 154(b) by 513 days.

(21) Appl. No.: 11/027,559

(22) Filed: Dec. 30, 2004

(65) Prior Publication Data

US 2006/0155818 A1 Jul. 13, 2006

(51) Int. Cl.
*G08B 1/08* (2006.01)

(52) U.S. Cl. ............... 340/539.22; 340/505; 340/221; 709/208; 709/224; 710/315

(58) Field of Classification Search ................ 340/505
See application file for complete search history.

(56) References Cited

U.S. PATENT DOCUMENTS

| | | | |
|---|---|---|---|
| 4,750,197 A * | 6/1988 | Denekamp et al. ........ 340/5.73 |
| 5,726,627 A | 3/1998 | Kane et al. |
| 6,889,165 B2 * | 5/2005 | Lind et al. .................. 702/183 |
| 6,919,803 B2 * | 7/2005 | Breed .................... 340/539.14 |
| 7,002,472 B2 | 2/2006 | Stratmoen et al. |
| 7,019,640 B2 * | 3/2006 | Canich et al. ......... 340/539.13 |
| 7,020,501 B1 * | 3/2006 | Elliott et al. ................ 455/574 |
| 7,049,952 B2 * | 5/2006 | Kulesz et al. ............... 340/506 |
| 7,053,767 B2 * | 5/2006 | Petite et al. ........... 340/539.17 |
| 7,098,784 B2 * | 8/2006 | Easley et al. .......... 340/539.13 |
| 7,156,129 B2 * | 1/2007 | Speasl et al. ................. 141/83 |
| 7,196,622 B2 * | 3/2007 | Lambright et al. .... 340/539.26 |
| 7,230,528 B2 * | 6/2007 | Kates .................... 340/539.19 |
| 2003/0236866 A1 * | 12/2003 | Light ........................ 709/220 |
| 2004/0041705 A1 | 3/2004 | Auerbach et al. |
| 2004/0073808 A1 * | 4/2004 | Smith et al. ................ 713/200 |
| 2004/0113783 A1 * | 6/2004 | Yagesh .................... 340/568.1 |
| 2004/0178880 A1 * | 9/2004 | Meyer et al. .............. 340/5.22 |
| 2004/0183673 A1 * | 9/2004 | Nageli .................. 340/539.13 |
| 2004/0196182 A1 | 10/2004 | Unnold |

(Continued)

OTHER PUBLICATIONS

Intel Research—Exploratory Research—Deep Networking [online], Heterogeneous Sensor Networks, © 2004 Intel Corporation, [retrieved on Dec. 13, 2004], retrieved from the Internet: <http://www.intel.com/research/exploratory/heterogeneous.htm>, pp. 1-14.

(Continued)

*Primary Examiner*—Benjamin C. Lee
*Assistant Examiner*—Eric M. Blount
(74) *Attorney, Agent, or Firm*—Fish & Richardson P.C.

(57) ABSTRACT

There are methods and apparatus, including computer program products, for sensor node management. The methods and apparatus may include the ability to receive a message indicating that a sensor node is active, determine the type of data generated by the sensor node, and designate a location to store the type of data. The methods and apparatus may also include the ability to determine a transformation for generating a seal condition based on the type of data.

20 Claims, 5 Drawing Sheets

U.S. PATENT DOCUMENTS

| | | |
|---|---|---|
| 2005/0046567 A1 | 3/2005 | Mortenson et al. |
| 2005/0088299 A1 | 4/2005 | Bandy et al. |
| 2005/0232747 A1* | 10/2005 | Brackmann et al. ........ 414/803 |
| 2005/0252259 A1 | 11/2005 | Ekstrom |
| 2006/0109106 A1 | 5/2006 | Braun |
| 2006/0164239 A1 | 7/2006 | Loda |

OTHER PUBLICATIONS

Intel Research—Exploratory Research—Deep Networking [online], Intel® Mote, © 2004 Intel Corporation, [retrieved on Dec. 13, 2004], retrieved from the Internet: < http://www.intel.com/research/exploratory/motes.htm>, pp. 1-8.

Gregory T. Huang, Casting the Wire, Technology Review, Jul./Aug. 2003, pp. 50-56.

* cited by examiner

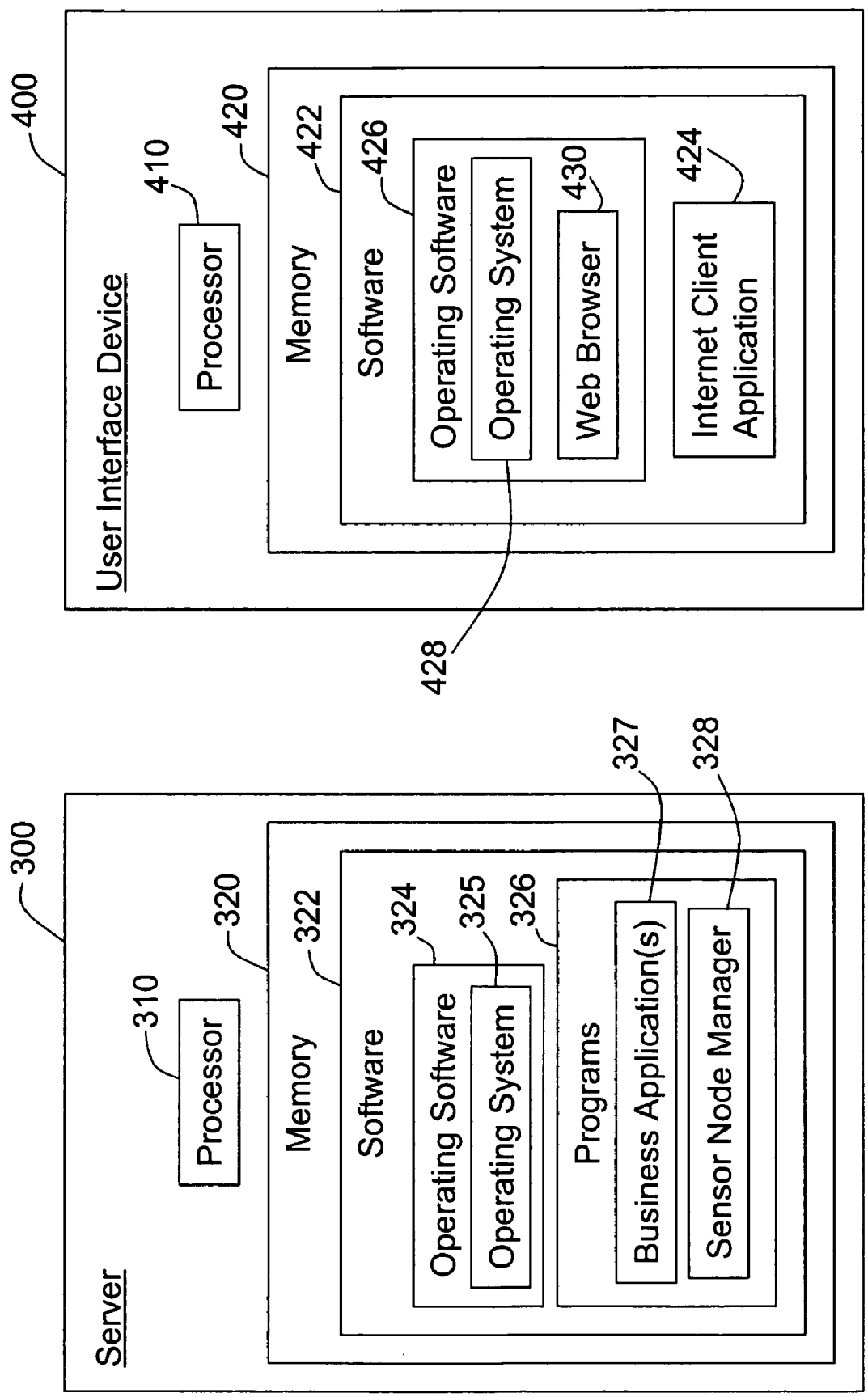

SENSOR NODE MANAGEMENT AND METHOD FOR MONITORING A SEAL CONDITION OF AN ENCLOSURE

BACKGROUND

This description relates to sensors (e.g., environmental sensors) and, more particularly, to sensor networks.

Goods are continuing to be shipped longer distances as economies and marketplaces continue to expand at national, international, and global levels. As goods are shipped longer distances, they are typically handled by more carriers, whether with the same company or with different companies. This provides increased opportunities for goods to be accidentally and/or surreptitiously lost and/or damaged. Additionally, it becomes more difficult to determine when the loss and/or damage occurred and who is at fault.

Various methodologies have been developed to assist in shipping goods. For example, position tracking sensors (e.g., Global Positioning System (GPS) sensors) are often attached to containers so that the location of goods may be determined and tracked. This assists in verifying the carriers who handled a container of goods, and possibly the goods themselves. However, it often does little to assist in understanding when goods in a container were lost and/or damaged, how the loss and/or damage occurred, and/or who is at fault.

SUMMARY

The techniques described herein provide methods and apparatus, including computer program products, for managing sensor nodes. In one general aspect, managing sensor nodes may include receiving a message indicating that a sensor node is active, determining the type of data generated by the sensor node, designating a location to store the type of data, and determining a transformation for generating a seal condition based on the type of data.

Managing sensor nodes may also include determining if the sensor node is part of a sensor network and, if the sensor node is part of a sensor network, instructing the sensor node how to operate with other sensor nodes of the sensor network. Instructing a sensor node how to operate with other sensor nodes of the sensor network may, for example, include determining whether combined data may represent a data type of two or more sensor nodes and, if combined data may represent a data type of two or more sensor nodes, instructing a sensor node of the sensor network to send combined data for the data type. Instructing a sensor node how to operate with other sensor nodes of the sensor network may also include instructing the sensor nodes of the sensor network how to report data between the sensor nodes.

Managing sensor nodes may additionally include receiving a registration request from a user interface device and determining whether the user interface device should receive a representation of the seal condition. A determination may also be made as to how to transform sensor node data for the user interface device.

Managing sensor nodes may further include receiving sensor node data and transforming the data into a seal condition (e.g., compromised or uncompromised). Transforming sensor node data into a seal condition may include comparing the transformed data to a predetermined seal condition. The predetermined seal condition may, for example, be the seal condition at the time a container associated with the sensor node is sealed.

Managing sensor nodes may also include determining whether a sensor node requires a programming update and, if the sensor node requires a programming update, sending a program update to the sensor node. Determining that a sensor node requires a programming update may include determining that the sensor node is malfunctioning.

Managing sensor nodes may be accomplished by a machine, a computer program product, or any other appropriate technique. Managing sensor nodes may allow efficient use of the sensor nodes' resources and the ability to use various sensor nodes and user interface devices. In particular implementations, sensor node management is accomplished, at least in part, by an enterprise server. This may provide the ability to generate action items and triggered transactions. Also, sensor nodes may be online or temporarily offline. When they are online, sensor data may be sent to a sensor node manager in real-time. The sensor node manager may be a real-time system that can take and respond to the real-time data in real-time. Thus, applications built on top of the manager may be real-time applications.

The details of one or more implementations are set forth in the accompanying drawings and the description below. Further features and aspects will become apparent from the description, the drawings, and the claims.

DESCRIPTION OF DRAWINGS

FIG. 3 is a block diagram illustrating one implementation of a server.

FIG. 4 is a block diagram illustrating one implementation of a user interface device.

DETAILED DESCRIPTION

A sensor network may be formed by a collection of sensor nodes that perform distributed sensing tasks and wirelessly communicate with each other. Sensor networks can be deployed in a variety of environments to perform tasks such as surveillance, environmental sampling, security, and health monitoring. In particular implementations, a sensor network may be managed, at least in part, by an enterprise server. The enterprise server may provide operating instructions to the sensor nodes and interoperability with the enterprise systems and communications. Other implementations, however, are possible.

Figure 1:
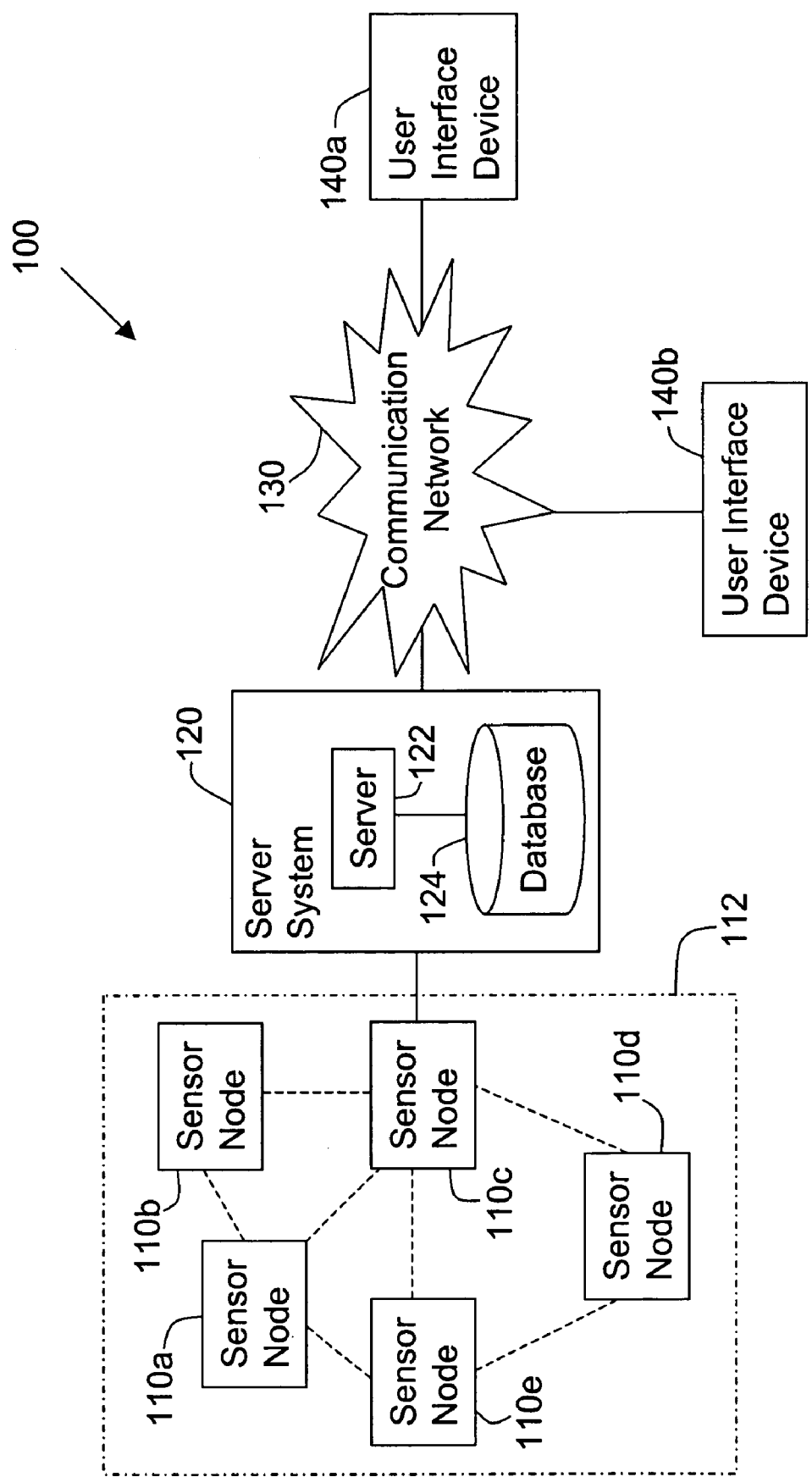
FIG. 1 is a block diagram illustrating one implementation of a sensor node system.

FIG. 1 illustrates one implementation of a sensor node system 100. Sensor node system 100 includes a collection of sensor nodes 110, a server system 120, a communication network 130, and user interface devices 140.

Sensor nodes 110 may sense and/or collect data samples from their physical environments (whether internal or external). The data samples may indicate one or more environmental conditions, such as, for example, illumination, acceleration, location, humidity, pressure, and/or temperature. Sensor nodes 110 may be distributed, co-located, or otherwise arranged, and together form a sensor network 112. In the illustrated implementation, the sensor nodes interact by wireless communications links (represented by dashed lines). In other implementations, two or more of the sensor nodes may be physically coupled (e.g., by wires or fiber optic cables) to each other. Sensor nodes 110 may also perform routing functions, for example, to create a multi-hop wireless networking fabric that relays data samples to server system 120.

Server system 120 receives the data gathered by sensor network 112, performs additional processing (if necessary), and delivers the data to one or more user interface devices 140 through communication network 130. Through a user interface provided at the user interface device 140, a user may inspect and interact with sensor network 112. For example, a user may view the activity of sensor nodes 110 at a node level or a network level, determine the health status (e.g., battery level) of individual sensor nodes 110, issue commands to set sensor sensitivity thresholds of sensor nodes 110, and/or reprogram individual sensor nodes 110.

Data associated with server system 120 is stored in a database 124. Although only one database is depicted in this implementation, database 124 represents any physical or virtual, centralized or distributed database suitable for the receipt and storage of files. In general, a file is an entity of data (i.e., a string of bytes that is capable of being manipulated as an entity). The files can represent any kind of information, such as, for example, text, images, executables, or binary data.

Communication network 130 may be any appropriate type of network (e.g., a wide-area network (WAN), a local-area network (LAN), or the Internet) and may be composed of one or more networks. Communication network 130 may operate by wireline and/or wireless techniques. Communication network 130 may use transmission control protocol/internet protocol ("TCP/IP") or any other appropriate protocol to send data. Network connections may be established via Ethernet, telephone line, cellular channels, or other transmission media. Communication network 130 may be internal to or external to an enterprise.

User interface devices 140 may be any appropriate devices for receiving data and presenting it to a user of the device. In particular implementations, the user interface devices may also receive data from a user and send it to server system 120. The user interface devices may present the received data to a user through visual, audible, or other appropriate techniques. The user interface devices may, for example, operate according to Web-enabled techniques. User interface devices 140 may be personal computers (PCs), workstations (WSs), mainframe computers, cellular telephones, personal digital assistants (PDAs), or any other appropriate devices. In particular implementations, one or more of user interface devices 140 may be a controller embedded in an otherwise non-computing device.

In one mode of operation, sensor nodes 110 are coupled to a wall of one or more containers (e.g., a shipping or storage container). For instance, sensor nodes 110 may be affixed to hazardous goods (e.g., chemical drums) stored in a storage facility and configured to monitor environmental conditions and relay the sensor readings to server system 120, which determines whether a dangerous situation exists within the storage facility.

As each sensor node 110 is activated, it may determine whether it detects other sensor nodes in its area (whether coupled to the container or neighboring containers) and whether a link to server system 120 may be established (whether directly or through multiple hops using other sensor nodes). If the sensor node does not detect other sensor nodes 110 or a path to server system 120, it may begin to take data readings and store them locally for later upload, something it may also do if communication is ever temporarily lost with another sensor node or the server system. If a sensor node 110 detects another sensor node 110, the sensor nodes may exchange information with that sensor node so that they remain aware of each other. If the sensor node detects a path to server system 120, the sensor node may register with the server system so that the server system may be aware of the sensor node and provide data and communication services therefore. For example, the server system may designate an area of memory (whether physical or logical) in database 124 to store data from the sensor node. Also, the server system may determine how to process data from the sensor node, if applicable. For example, the server system may determine a seal condition (e.g., compromised or uncompromised) for the container associated with the sensor node. The seal state may, for instance, be combination of the data readings from the sensor node. The server system may also determine how to communicate data from the sensor node or data about the sensor node to one or more of user interface devices 140.

Server system 120 may also provide data and communication services for sensor network 112. For example, server system 120 may determine that sensor nodes 110 are associated with each other, through the fact that the sensor nodes are communicating with each other, a preconfigured specification, messaging from the sensor nodes, or any other appropriate technique. Server system 120 may then combine (e.g., average or filter) the data from the sensor nodes to determine a single piece of data (e.g., temperature). The server system may compare the combined data against the individual readings to determine whether any suspect activity is occurring, on the part of a sensor node (e.g., a malfunction) or in the vicinity of a sensor node (e.g., a container breach). The server system may also instruct the sensor nodes how to communicate with each other. For example, the server system may establish a fast relay system for sending data. Also, the server system may instruct one or more sensor nodes to combine data before sending it to the server system. Thus, the server system may assist sensor nodes in forming an efficient sensor network.

As the sensor nodes function, they may perform data readings with their sensors. The readings may be taken at any appropriate interval (e.g., two seconds). The data for the readings may then be sent to server system 120 for storage and/or analysis.

At an appropriate time, the data from the sensor nodes may begin to indicate a sealed condition of the container. The appropriate time may, for example, be determined by activation of the sensor node, achievement of a certain condition (e.g., darkness), achievement of a certain time (e.g., 2:00 pm), container closure, user input at the sensor node, or user input at one of user interface devices 140. In particular implementations, the sensor nodes may begin their sensor readings when the appropriate time has been reached. This may, for example, be accomplished by the server system informing the sensor nodes of the appropriate time.

The sealing condition of the sensor nodes' associated containers may be evaluated in any one of a variety of manners. For example, the readings may be compared against predetermined values to determine whether a material variance (e.g., ±25%) has occurred. The predetermined values may, for example, be the last readings taken before the sealing of the container.

The formula used for evaluating the sealing condition may be specified in any appropriate manner. For example, a user may specify a set of parameters through a user interface device; the server system may determine the parameters that may be specified. When specifying a parameter, the user may, for example, type a parameter into a parameter field or select a parameter from a predefined list. The user-specified parameters, S1 through SN, may be stored in memory at the user interface device or the server system. For each of the parameters S1 through SN (denoted Si), the user may define a relationship for a parameter Si recorded at an initial time, ts, and the same parameter Si recorded at a later time, t. For example, Si(ts) may represent an initial temperature reading while Si(t) may represent a temperature reading recorded one minute after the initial temperature reading. An example mathematical relationship between the temperature readings is to take an absolute value of their difference (i.e., |Si(ts)−Si(t)|). The user may type the relationship into an input field or select a predefined relationship from a list or a drop-down menu. The user may also define further relationships between parameters Si recorded at various times. For example, the user may define a mathematical relationship that sums the absolute values of the differences between the parameter values recorded at an initial time, Si(ts), and their corresponding parameter values, Si(t), recorded at a later time. In this example, the formula for an e-seal at time t, denoted E(t), is $$E(t)=|Si(ts)-Si(t)|.$$

In this manner, a user may specify a formula that includes any mathematical relationship between parameters or combinations of parameters. For example, the formula may be a sum of the absolute differences between successive parameter readings. An example of such a formula is as follows:

$$E(t)=|Si(t)-Si(t+\Delta t)|,$$

where Δt is a finite increment of time.

Examples of other formulas that may be used include, but are not limited to, a running average of parameter values and a weighted average of parameter values. The seal condition may also be derived from a statistical measure such as mean or variance, or it may be based on a statistical test. Such statistical tests include chi-squared tests, Fisher sign tests, paired or unpaired t-tests, binomial tests, and other similar statistical tests.

Defining the relationship between parameters Si may also include defining "if cases", in which an alternative relationship or formula is applied if a given condition exists (e.g., a defective sensor is detected). For example, if a battery of a temperature sensor is low, or if the temperature sensor experiences an outage, an alternate formula that excludes temperature reading parameters may be used in place of an original formula that included temperature as a parameter.

The formula, including parameters and "if cases", may be stored in memory at the user interface device and/or server system. The user may retrieve the formula at a later time and make modifications to it.

The formula may be uploaded from the user interface device to server system 120 and/or sensor network 112. Thus, the server system and/or the sensor network may be used to determine the seal condition and to determine if it has been violated.

In particular implementations, sensor nodes 110 may work together in providing data to server system 120. For example, the data readings of a group of sensor nodes 110 may be combined so that less data is sent to server system 120. Also, if one of sensor nodes 110 determines that it may be making an anomalous reading, it may check with a neighboring sensor node. If the neighboring sensor node is making a similar reading, the first sensor node may determine that it is not malfunctioning. If, however, the neighboring sensor node is not making a similar reading, the first sensor node may determine that a malfunction or a seal compromise has occurred. The first sensor node may then send the data reading to server system 120 or send an alert message.

Although discussed in the context of monitoring the sealed state of containers, sensor network 112 may be used in a wide variety of applications, including geophysical monitoring, precision agriculture, habitat monitoring, condition-based equipment maintenance, supply chain management, asset tracking, and healthcare monitoring. A deployed sensor network may, however, target a single application and be tailored for the application's requirements. For example, in a storage facility environment, a sensor network may assist in ensuring that environment, health, and safety issues are continually monitored and assessed.

Figure 2:
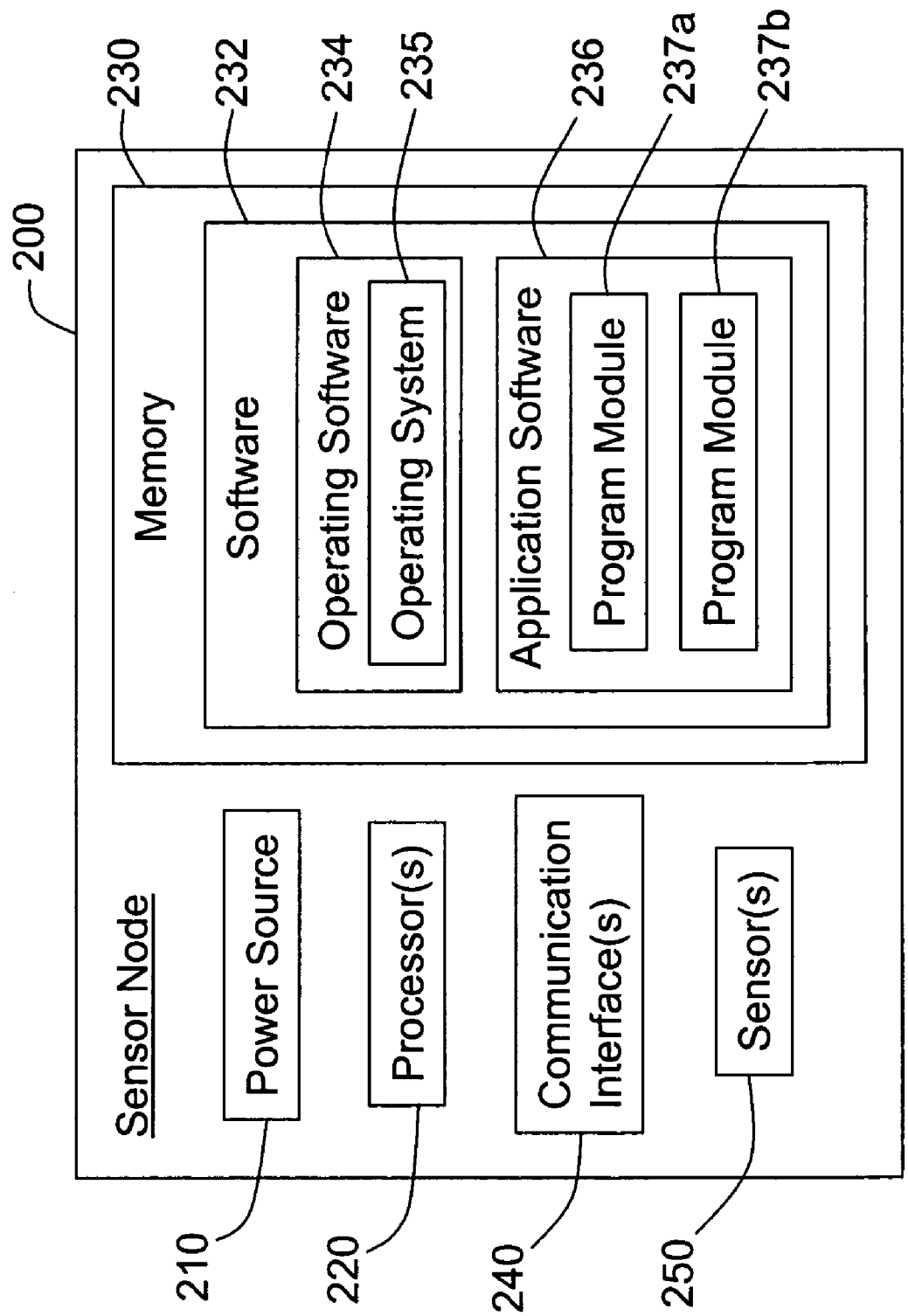
FIG. 2 is a block diagram illustrating one implementation of a sensor node.

FIG. 2 illustrates one implementation of a sensor node 200. In general, sensor node 200 is an electronic device having sensing, processing, and communication capability. Sensor node 200 is one example of a sensor node for system 100.

Sensor node 200 includes a power source 210 (e.g., a battery), one or more processors (referred to herein as "processor 220"), a memory 230, one or more communication interfaces (referred to herein as "communication interface 240"), and one or more sensors 250. Processor 220 operates, at least in part, according to software 232 stored in memory 230. Communication interface 240 may provide a wireless and/or wireline link. If sensor node 200 is not directly connected to a server system, the sensor node typically only includes a wireless interface (e.g., an antenna). If sensor node 200 serves as a gateway between an associated sensor network and an server system, the communication interface typically includes both a wireless interface and a wireline interface (e.g., a network interface card).

Software 232 includes operating software 232 and application software 236. Operating software 232 includes an operating system 235, such as, for example, TinyOS, which was developed at the University of California, Berkeley. Application software 236 includes one or more program modules 237. Each program module 237 includes executable or interpretable code that is loaded into memory 230 prior to deployment of the sensor node and/or received over communication links post-deployment. Such post-deployment programming enables a sensor node embedded in an environment to be programmed (or reprogrammed) on-the-fly, thus providing for application upgrades or changes, and in some cases, recovery from program-induced crashes or failures (e.g., through remote rebooting).

Sensor node 200 includes one or more sensors 250 for detecting and possibly measuring different environmental conditions, such as, for example, acceleration, vibration, temperature, pressure, sound, light, movement, and proximity to other sensor nodes. The sensed raw data resulting from a detection can be processed and analyzed autonomously or in cooperation with neighboring sensor nodes to generate combined sensor readings. The combined sensor readings may then be passed from sensor node to sensor node on a multi-hop route to a server system. Communicating combined sensor readings rather than a continuous stream of raw data between sensor nodes may reduce the power required to convey data within a sensor network.

FIG. 3 illustrates one implementations of a server 300. In general, server 300 is an electronic device having processing, storage, and communication capability. Server 300 is one example of a server for system 100.

Server 300 includes a processor 310 and memory 320 that stores software 322. Processor 310 executes software 322, which includes operating software 324 and one or programs 326. Operating software 324 includes an operating system 325, which may include one or more routines for accomplishing communication over a communication network. Programs 326 includes business applications 327 and a sensor node manager 328. Sensor node manager 328 may be responsible for allowing sensor nodes to communicate with other programs in server 300, other programs in an enterprise, and user interface devices, as well as for configuring the sensor nodes for operation and evaluating the sensor node data.

In particular implementations, server 300 may be an SAP Web Application Server running mySAP Product Lifecycle Management ("PLM") as one of business applications 327, both of which are available from SAP AG of Walldorf (Baden) Germany. mySAP PLM is a business application that can be used for life-cycle data management, program and product management, life-cycle collaboration, quality management, asset life-cycle management, and environment, health and safety.

FIG. 4 illustrates one example of a user interface device 400. In general, user interface device 400 is an electronic device having processing, storage, and presentation capability. User interface device 400 is one example of a user interface device for system 100.

User interface device 400 includes one or more processor(s) 410 (referred to simply as "processor 410") and memory 420 that stores software 422, which processor 410 may execute. Software 422 includes an Internet client application 424 and operating software 426. Internet client application 424 includes one or more routines used in implementing the TCP/IP protocol or HTTP(s) protocol, which allows the user interface device to communicate over a communication network. Operating software 426 includes an operating system 426, such as, for example, Windows XP®, and a Web browser 428, such as, for example, Internet Explorer®, and may include various application programs. In operation, the user interface device may enter into a client-server relationship with a server.

Figure 5:
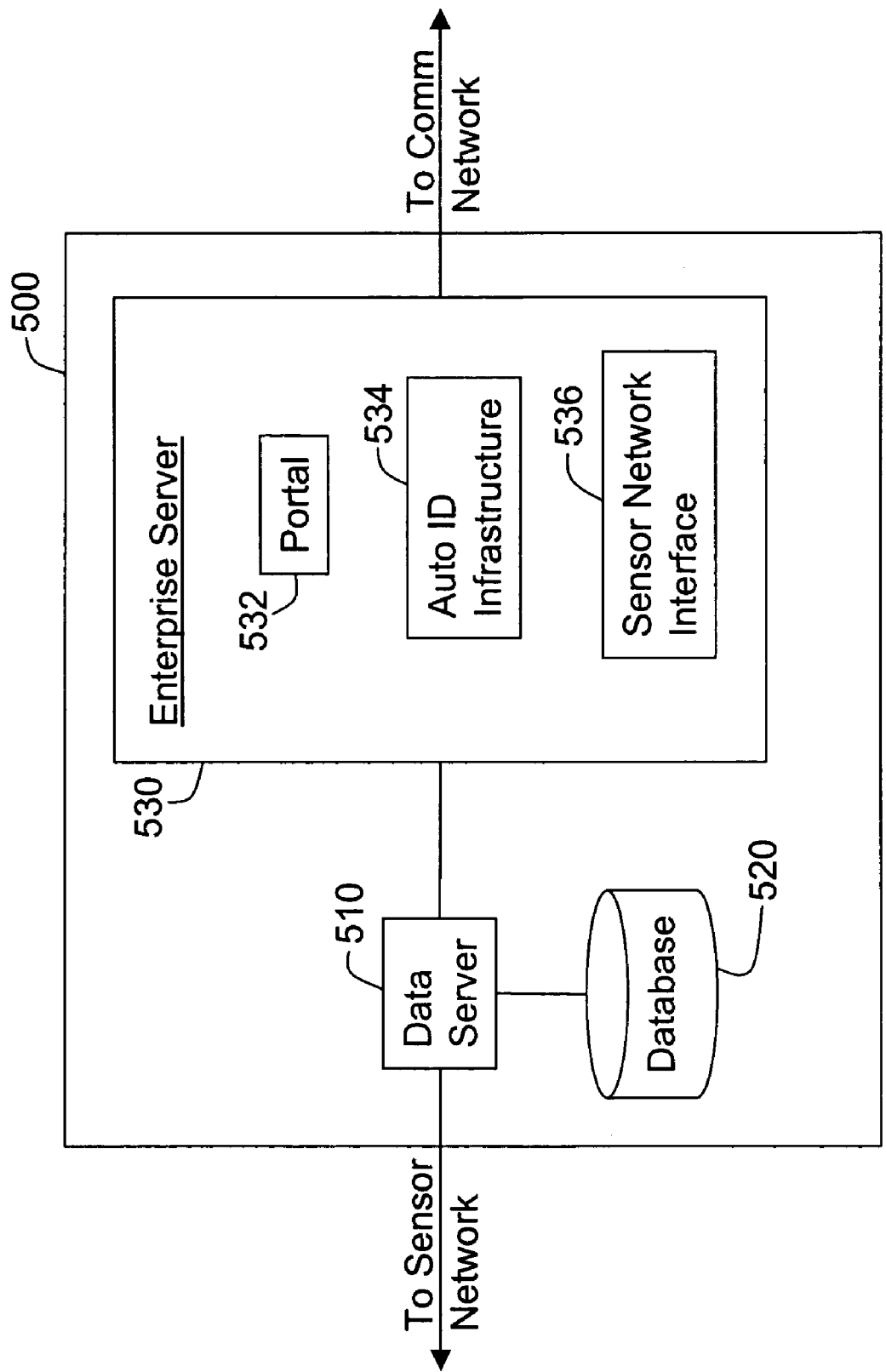
FIG. 5 is a block illustrating another implementation of a server system.

FIG. 5 illustrates one implementation of a server system 500. Server system 500 includes a data server 510, a database 520, and an enterprise server 530. The coupling illustrated between data server 510, database 520, and enterprise server 530 in FIG. 5 is a logical illustration of server system 500. Thus, for example, data server 510 and enterprise server 530 may be physically separate but communicating via a communication network.

Data server 510 is responsible for collecting and storing the data from sensor nodes in database 520. Data server 510 may, for example, be a Stargate™ server from Crossbow Technology, Inc. of San Jose, Calif. Enterprise server 530 is responsible for managing sensor nodes and evaluating, transforming, and communicating the data from the sensor nodes to one or more user interface devices (not shown).

Enterprise server 530 includes a portal 532, an Auto-ID Infrastructure 534, and a sensor network interface 536. Portal 532 provides access to the data in the enterprise and, in particular implementations, may be a Website that serves as an entry point to the enterprise to provide a structured presentation of contents, search functions, and other services. Auto-ID Infrastructure 534 allows external devices (e.g., sensor nodes) to work with enterprise server 530 and/or other devices.

In particular, Auto-ID Infrastructure 534 may be available from SAP AG of Walldorf (Baden) Germany. Thus, Auto-ID Infrastructure may be a software infrastructure that includes an internal device controller that interfaces, communicates, controls, and monitors different kinds of hardware devices, such as RFID readers, bar code readers, and/or sensor networks. In doing so, the infrastructure may identify and classify the hardware devices and try to determine a unified view for a network using various algorithms and tools. The infrastructure may also work with external device controllers. Via a device interface, a user may configure devices via an Auto-ID Infrastructure user interface. The Auto-ID Infrastructure may also include a rule engine to respond to incoming data from a device accordingly (for understanding the messages and for running different applications). For example, it may allow for understanding that a message is from a sensor node in a cargo container at a certain location and that the data is temperature data. The Auto-ID Infrastructure may also allow developers to build applications on top of it.

Sensor network interface 536, which may be part of the device controller, is responsible for determining how to communicate with sensor nodes. For example, sensor network interface 536 may determine the format in which a sensor node will send data and determine an appropriate transformation for the data. The formats may be based on predetermined formats, for different sensor node types, for example, or dynamically determined, based on self-describing languages (e.g., XML), for example. Auto ID infrastructure 534 and sensor network interface 536 are one implementation of a sensor node manager.

As illustrated, enterprise server 530 may be a Web Application Server in SAP Netweaver from SAP AG of Walldorf (Baden) Germany. SAP NetWeaver integrates information and business processes across technologies and organizations using Internet standards such as HTTP, XML, and Web services.

In one mode of operation, enterprise server 530 receives a message indicating that a sensor node is active. The message may be a sensor node registration message, a service query message, or any other appropriate message. Once such a message has been received, Auto-ID Infrastructure 534 identifies and classifies the sensor node, and sensor network interface 536 determines the type of data generated by the sensor node. The sensor node may, for example, generate temperature, illumination, and humidity data.

Once the type of data generated by the sensor node is determined, data server 510 designates a location to store the type of data in database 520. Allowances may be made for the fact that certain data is of different sizes than other data. Auto-ID Infrastructure 534 may also determine a technique to transform the data types into a seal condition. For example, a mathematical formula that uses the data readings as input may be used. In particular implementations, infrastructure 534 may receive instructions regarding a seal condition from a user interface device.

The Auto-ID Infrastructure may also determine whether the senor node is part of a sensor network. This may, for example, be accomplished by determining whether the sensor node is in communication with other sensor nodes or whether the sensor node is part of a predetermined network. If the sensor node is part of a sensor network, the Auto-ID Infrastructure may instruct the sensor node how to operate with other sensor nodes of the sensor network. This may include instructing the sensor node as to which sensor nodes to communicate, instructing the sensor node as to which sensor node to send its data readings, and instructing the sensor node as to what to do in case of a communication loss. If other sensor nodes are to send their data readings to the sensor node, the sensor node may also be instructed to combine (e.g., average) the data readings before sending them to data server 510.

Portal 532 may receive a request from a user interface device to receive data regarding the sensor node and/or sensor network of which it is a part. The request may, for example, be a registration request. A user may also access enterprise server 530 through a Web application server. A developer may access the enterprise server through ABAP or Java.

If a request from a user interface device has been received, the Auto-ID Infrastructure may determine whether the user interface device should receive the sensor node data (e.g., raw data readings and/or seal states). A user interface device may receive sensor node data if, for example, it is associated with the sensor network. In implementations for monitoring seal states of containers, sensor network interface 536 may determine how to transform the sensor node data so that Auto-ID Infrastructure 534 can determine a seal state, and Auto-ID Infrastructure 534 may determine how to transform the seal state for the user interface device. Portal 532 determines how to present the sensor node data at the user interface device. Portal 532 may, for example, use an iView to present the data. An iView is an SAP portal solution that can be used to display data from applications, documents, and the Internet in the portal.

As sensor node data is received, data server 510 stores the data in the designated portion of database 520. In particular implementations, the data server could send data to the Auto-ID Infrastructure at regular intervals (e.g., two seconds). The sensor node data may then be sent to the enterprise server, where, for example, a sealing state may be determined based on the data. The Auto-ID Infrastructure may then cause the sensor node data to be sent to the user interface device.

The sensor network interface may also monitor operation of sensor nodes to determine whether a sensor node requires a programming update. This may, for example, be accomplished by determining that a sensor node is malfunctioning, based on data readings, for instance. If a programming update is required, a program update is sent to the sensor node. The program update to the malfunctioning sensor node may be wirelessly forwarded dynamic code. The program update may be sent by an appropriate communication protocol.

Although several operations of system 500 have been discussed, system 500 may have various other operations. For example, system 500 may allow determining when a seal condition (e.g., darkness) has occurred. The data at the time of the sealed condition may, for example, be used as a baseline evaluating the seal condition.

System 500 may have a variety of additional features. For example, it may allow action items and triggered transactions to be generated. This may be accomplished through the enterprise server having many sub-systems for different enterprise solutions. When a message from a sensor network is sent to system 500, the message may be analyzed and actions generated, including triggering some transactions to other systems where appropriate applications are running. For instance, a shipment rejection transaction may be trigged to a warehouse management system if a seal is broken at receipt. Additionally, an enterprise server may allow follow-up action items, alerts across enterprises, and analysis of risk analysis patterns.

Figure 6:
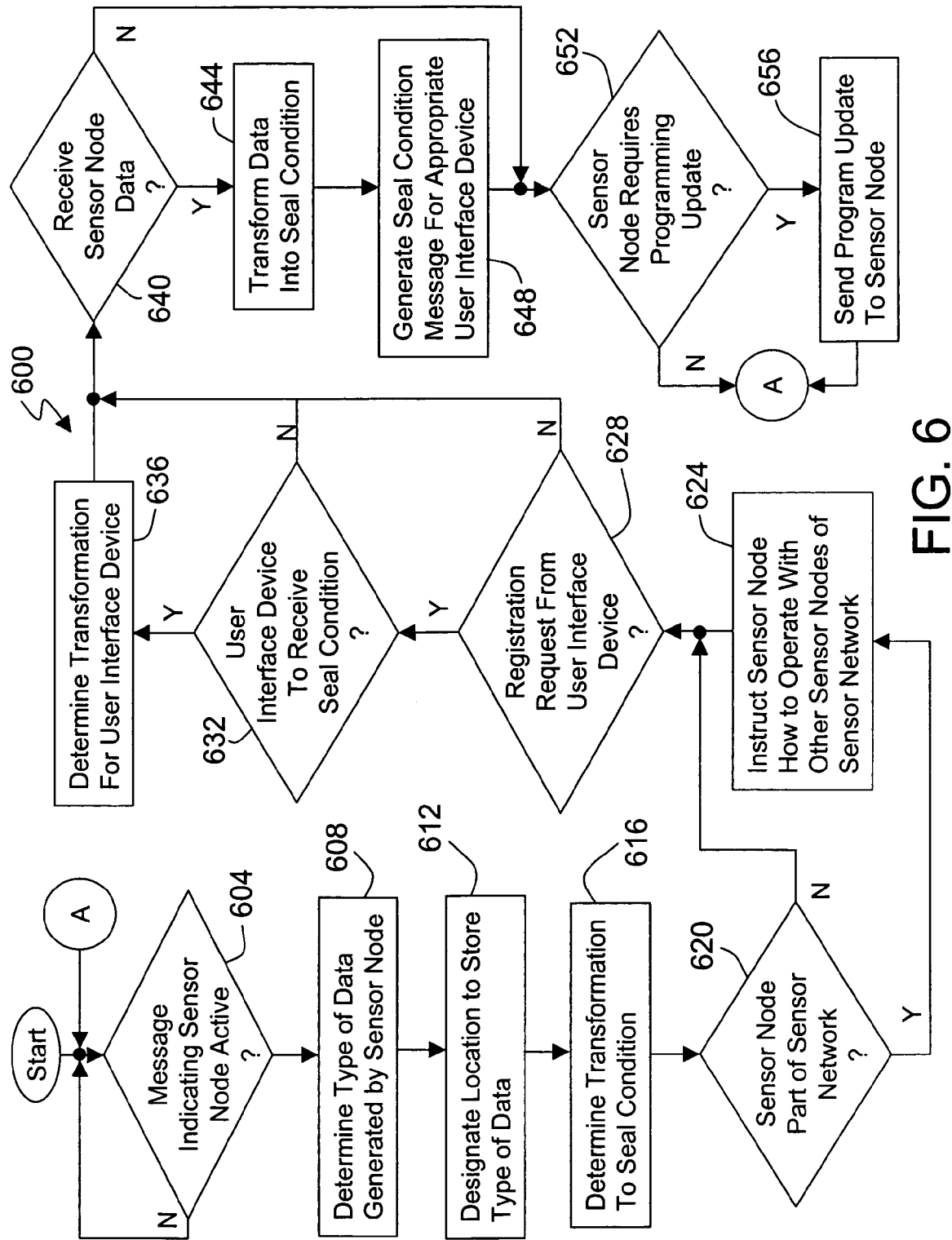
FIG. 6 is flow chart illustrating one implementation of a process for sensor node management.

FIG. 6 illustrates a one implementation of a process 600 for sensor node management. Process 600 may, for example, represent the operations of server system 120.

Process 600 begins with waiting to receive a message indicating that a sensor node is active (operation 604). The message may, for example, be a registration or service query message. If such a message has been received, the process continues with determining the type of data generated by the sensor node (operation 608) and designating a location (whether physical or logical) to store the type of data (operation 612). A sensor node may, for example, generate temperature, illumination, and humidity data. The data representing each environmental condition may be of various sizes.

Process 600 continues with determining a transformation for generating a seal condition based on the type of generated data (operation 616). For example, a mathematical formula may be selected based on the type of data generated by the sensor node. As another example, each type of data may be subject to its own test, and the acceptability of one or more of the data readings may have to be satisfied.

The process also calls for determining whether the sensor node is part of a sensor network (operation 620). This may, for example, be accomplished by determining whether the sensor node is in communication with other sensor nodes or whether the sensor node is part of a predetermined network. If the sensor node is part of a sensor network, process 600 includes instructing the sensor node how to operate with other sensor nodes of the sensor network (operation 624). This may include instructing the sensor node as to with which sensor nodes to communicate, instructing the sensor node as to which sensor node to send its data readings, and instructing the sensor node as to what to do in case of a communication loss. If other sensor nodes are to send their data readings to the sensor node, the sensor node may also be instructed to combine (e.g., average) the data readings before communicating them on.

The process continues with determining whether a registration request from a user interface device has been received (operation 628). If a registration request has been received, the process calls for determining whether the user interface device should receive the seal condition (operation 632). The user interface device may receive the seal condition if, for example, it is requesting data regarding the sensor network of which the sensor node is a part. The process also calls for determining how to transform the seal condition for the user interface device (operation 636). For example, the user interface device may be using a text, graphical, or audible user interface, and the transformation may translate the data into the appropriate format.

Process 600 continues with determining whether sensor node data has been received (operation 640) and, if sensor node data has been received, transforming the data into a seal condition (operation 644). The seal condition may, for example, be compromised or uncompromised. Process 600 calls for generating a message regarding the seal condition for the appropriate user interface device (operation 648). The message may then be sent to the user interface device.

The process also calls for determining whether the sensor node requires a programming update (operation 652). This may, for example, be accomplished by determining that the sensor node is malfunctioning, based on data readings, for instance. If a programming update is required, a program update is sent to the sensor node (operation 656).

The process continues with returning to check for another message indicating that a sensor node is active (operation 604). The process may continue checking for active sensor nodes, receiving registration requests from user interface devices, receiving sensor node data and determining seal conditions, and updating sensor nodes for any number of cycles.

Although FIG. 6 illustrates one implementation of a process for sensor node management, other processes may include fewer, additional, and/or a different arrangement of operations. For example, checking for active sensor nodes, receiving registration requests from user interface devices, receiving sensor node data and determining seal conditions, and updating sensor nodes may occur in any order. Moreover, one or more of these operations may occur simultaneously (e.g., in parallel). As another example, a process may include determining a transformation of sensor node data for a user interface device. As a further example, a process may include evaluating a seal condition. For instance, a numeric value for a seal condition may be determined and the meaning of the seal condition (e.g., compromised or uncompromised) may be determined. As an additional example, a process may include determining when a seal condition (e.g., darkness) has occurred. The data at the time of the sealed condition may, for example, be used as a baseline evaluating the seal condition. As another example, a process may not include updating sensor nodes.

The techniques and the functional operations described can be implemented in digital electronic circuitry or in computer software, firmware, or hardware, including the structural means disclosed in this specification and structural equivalents thereof, or in combinations of them. The techniques can be implemented as one or more computer program products (i.e., one or more computer programs tangibly embodied in an information carrier (e.g., in a machine-readable storage device or in a propagated signal)) for execution by, or to control the operation of, a data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers, at one site or distributed across multiple sites and interconnected by a communication network.

The processes and logic flows described in this specification, including the operations of the techniques, can be performed by one or more programmable processors executing one or more computer programs to perform functions of the techniques by operating on input data and generating output. The processes and logic flows can also be performed by, and apparatus of the techniques can be implemented as, special purpose logic circuitry (e.g., an FPGA (field programmable gate array) or an ASIC (application-specific integrated circuit)).

Processors suitable for the execution of a computer program include, by way of example, general and special purpose microprocessors and any one or more processors of any kind of digital computer. Generally, a processor will receive instructions and data from a read-only memory or a random-access memory or both. The essential elements of a computer are a processor for executing instructions and one or more memory devices for storing instructions and data. Generally, a computer will also include, or be operatively coupled to receive data from or transfer data to, or both, one or more mass storage devices for storing data (e.g., magnetic disks, magneto-optical disks, or optical disks). Information carriers suitable for embodying computer program instructions and data include both volatile and non-volatile memory, including by way of example semiconductor memory devices (e.g., EPROM, EEPROM, and flash memory devices); magnetic disks (e.g., internal hard disks or removable disks); magneto-optical disks; and CD-ROM and DVD-ROM disks. The processor and the memory can be supplemented by, or incorporated in, special purpose logic circuitry.

The techniques can be implemented in a computing system that includes a back-end component (e.g., a data server), a middleware component (e.g., an application server), or a front-end component (e.g., a client computer having a graphical user interface or a Web browser through which a user can interact with an implementation of the techniques), or any combination of such back-end, middleware, and front-end components. The components of the system can be interconnected by any form or medium of digital data communication (e.g., a communication network). Examples of communication networks include a local area network ("LAN") and a wide area network ("WAN") (e.g., the Internet).

The computing system can include clients and servers. A client and server are generally remote from each other and typically interact through a communication network. The relationship of client and server arises by virtue of computer programs running on the respective computers and having a client-server relationship to each other.

Other implementations are within the scope of the following claims. The above are examples for illustration only and not to limit the alternatives in any way. The techniques described herein can be performed in a different order and still achieve desirable results.

The invention claimed is:

1. A sensor node management method performed by a server system, the method comprising:
   receiving a message indicating that a sensor node is active;
   determining the type of data generated by the sensor node;
   designating a location to store data of the determined type of data; and
   determining a transformation for generating a seal condition based on the determined type of data.

2. The method of claim 1, further comprising:
   determining if the sensor node is part of a sensor network; and
   if the sensor node is part of a sensor network, instructing the sensor node how to operate with other sensor nodes of the sensor network.

3. The method of claim 2, wherein instructing the sensor node how to operate with other sensor nodes of the sensor network comprises:
   determining whether combined data may represent a data type of two or more sensor nodes; and
   if combined data may represent a data type of two or more sensor nodes, instructing a sensor node of the sensor network to send combined data for the data type.

4. The method of claim 2, wherein instructing the sensor node how to operate with other sensor nodes of the sensor network comprises instructing the sensor nodes of the sensor network how to report data between the sensor nodes.

5. The method of claim 1, further comprising:
receiving a registration request from a user interface device; and
determining whether the user interface device should receive a representation of the seal condition.

6. The method of claim 5, further comprising determining how to transform sensor node data for the user interface device.

7. The method of claim 1, further comprising:
receiving sensor node data; and
transforming the data into a seal condition.

8. The method of claim 7, wherein the seal condition comprises compromised or uncompromised.

9. The method of claim 7, wherein transforming sensor node data into a seal condition comprises comparing the transformed data to a predetermined seal condition.

10. The method of claim 9, wherein the predetermined seal condition comprises the seal condition at the time a container associated with the sensor node is sealed.

11. The method of claim 1, further comprising:
determining whether the sensor node requires a programming update; and
if the sensor node requires a programming update, sending a program update to the sensor node.

12. The method of claim 11, wherein determining whether the sensor node requires a programming update comprises determining that the sensor node is malfunctioning.

13. A system for sensor node management, the system comprising:
a server system operable to:
receive a message indicating that a sensor node is active;
determine the type of data generated by the sensor node;
designate a location to store data of the determined type of data; and
determine a transformation for generating a seal condition based on the determined type of data.

14. The system of claim 13, wherein the server system is further operable to:
determine if the sensor node is part of a sensor network; and
if the sensor node is part of a sensor network, instruct the sensor node how to operate with other sensor nodes of the sensor network.

15. The system of claim 14, wherein instructing the sensor node how to operate with other sensor nodes of the sensor network comprises:
determining whether combined data may represent a data type of two or more sensor nodes; and
if combined data may represent a data type of two or more sensor nodes, instructing a sensor node of the sensor network to send combined data for the data type.

16. The system of claim 13, wherein the server system is further operable to:
receive a registration request from a user interface device; and
determine whether the user interface device should receive a representation of the sealed condition.

17. The system of claim 16, wherein the server system is further operable to determine how to transform sensor node data for the user interface device.

18. The system of claim 13, wherein the server system is further operable to:
receive sensor node data; and
transform the data into a seal condition.

19. The system of claim 13, wherein the server system is further operable to:
determine whether the sensor node requires a programming update; and
if the sensor node requires a programming update, send a program update to the sensor node.

20. A system for sensor node management, the system comprising:
an enterprise server operable to:
receive a message indicating that a sensor node is active,
determine the type of data generated by the sensor node,
determine a transformation for generating a seal condition based on the determined type of data,
determine if the sensor node is part of a sensor network,
if the sensor node is part of a sensor network, instruct the sensor node how to operate with other sensor nodes of the sensor network,
receive a registration request from a user interface device,
determine whether the user interface device should receive a representation of the seal condition,
determine how to transform sensor node data for the user interface device,
receive sensor node data,
transform the data into a seal condition,
determine whether a sensor node requires a programming update, and
if the sensor node requires a programming update, send a program update to the sensor node; and
a data server operable to:
designate a location to store data of the determined type of data, and
receive and store the sensor node data.

* * * * *